United States Patent [19]

Ehrhardt et al.

[11] Patent Number: 4,695,047
[45] Date of Patent: Sep. 22, 1987

[54] T-SLOT HYDRAULIC CLAMP SYSTEM

[75] Inventors: Winfried Ehrhardt; Klaus Richter; Adolf Lehr, all of Laubach, Fed. Rep. of Germany

[73] Assignee: Carr Lane Roemheld Manufacturing Co., Inc., St. Louis, Mo.

[21] Appl. No.: 918,573

[22] Filed: Oct. 14, 1986

[51] Int. Cl.⁴ ............................................. B23Q 3/02
[52] U.S. Cl. .................................................. 269/309
[58] Field of Search .......... 198/345; 269/20, 309–311, 269/91–94; 254/18; 409/903

[56] References Cited

U.S. PATENT DOCUMENTS

| | | | |
|---|---|---|---|
| 2,281,482 | 4/1942 | Crayton | 269/93 |
| 3,788,632 | 1/1974 | Lukas . | |
| 3,998,444 | 12/1976 | Stockwell . | |
| 4,058,885 | 11/1977 | Bergman . | |
| 4,174,828 | 11/1979 | Bergman . | |
| 4,356,904 | 11/1982 | Siarto | 198/345 |
| 4,445,675 | 5/1984 | Kitaura . | |
| 4,562,919 | 1/1986 | Cattani | 198/345 |
| 4,577,847 | 3/1986 | Schedwin | 269/309 |
| 4,583,631 | 4/1986 | Yonezawa et al. | 198/345 |
| 4,611,484 | 9/1986 | Kissinger et al. | 269/309 |

Primary Examiner—Robert C. Watson
Attorney, Agent, or Firm—Jerome A. Gross

[57] ABSTRACT

A hydraulic clamp embedded in a T-slot of a machine tool bolster plate, has a T-slotted piston rod end which fits continuously within the T-slot of the bolster plate. Using a T-configured member secured to the underside of a die shoe, and slid into the T-slot, actuating the hydraulic clamp draws the shoe downward, firmly clamping it against the bolster surface. If, instead of a T-configured member, and I-beam member (in effect, a double T) is used in a die shoe having a T-slotted undersurface, the clamping force is extended over the entire length of the I-beam. The effect is to avoid distortion of the die shoe. In addition to the surface friction attendant to the present distortion-free clamping, positive resistance of sideward displacement of the shoe is provided by the T-slot edges. When the present invention is not employed for clamping, the T-slotted surfaces of the bolster plates are unencumbered and may therefore be used and cleaned in an ordinary manner.

5 Claims, 9 Drawing Figures

T-SLOT HYDRAULIC CLAMP SYSTEM

FIELD OF THE INVENTION

This invention relates to the clamping of die sets in reciprocating machine tools such as punch and draw presses, and particularly to hydraulic clamps for securing such die sets.

DESCRIPTION OF THE PRIOR ART

Machine tools, such as punch and draw presses, conven-tionally have a fixed lower bed and a reciprocating upper bed or ram upon which bolster plates are mounted. The surfaces of the bolster plates may be slotted with inverted T-slots extending from front to rear, which may be used to secure the die sets used.

Such die sets are conventionally secured by clamping, using mechanical or hydraulic clamps. The conventional practice is first to place the lower die in position on the bed's bolster plate and secure it by clamps around the edges of its die shoe; such clamps may be attached to the T-slots. Then the upper die is located on the lower; the ram is lowered and the edges of the upper die shoe are similarly clamped to the ram's bolster plate.

The force relied upon, primarily or exclusively, for retaining the die shoes in their clamped positions is the friction of the die shoes, which is a function of their clamping against the bolster plate's surfaces. The sideward forces which accompany operation of the machine tool, including the sideward reactions of the metal being formed, may be very large; and, as with a high speed punch press, may in effect hammer the die shoes sideward. To obtain a high resisting friction, localized edge clamps are drawn very tight, pinching the shoe edges and setting up internal stresses. With such stresses present, repeated press operations bring about distortions and misalignment.

Using conventional edge clamping, the time required for locating the die shoes in precise position may be objectionably large, especially where the die set is used for short runs only.

Hydraulic clamping cylinders are shown embedded in work table surfaces in at least the following patents:

U.S. Pat. No. 4,445,675 shows a clamp unit C whose surface contains a gridwork of T-slots; a hydraulic clamp is located at the midpoint of each grid element, as far as possible from the T-slot. Each hydraulic clamp has a short rod whose upper end, below the unit's surface, is internally threaded. The user may select which clamp he will use; into each of these he threads a clamping bolt, first passing it through an upper clamping plate and a greatly oversized bore in the edge of the die shoe.

U.S. Pat. No. 4,143,868 appears to show hydraulic clamps embedded almost entirely below a work table surface which has no T-slots. Each clamp serves to draw downwardly a flat member whose inner end presses downward on the edge of a die shoe, its outer end being balanced on a support block.

SUMMARY OF THE INVENTION

The fluid-pressure activated clamps of the present invention are embedded directly within the T-slots of the upper and lower bolster plates, with each piston rod outer end divided by a T-slot which, before the actuator is drawn inward, is slidably continuous with a T-slot of the bolster. To the lower surfaces of the die shoes are fitted downward-extending force-transmitting attaching members formed to the T-configuration, enabling them to be slid into the bolster T-slots and thereby into the T-slotted ends of the piston rods. When fluid pressure is supplied to the actuators, the piston rods draw these attaching members downward, clamping the bases of the die shoes firmly against the bolster surfaces on both sides of the T-slot.

By using an I-beam shaped attaching member, fitted into a T-slot formed in the undersurface of the die shoe, the clamping force is distributed along the interior of the die shoe, over the entire length of the I-beam member. This avoids completely the die shoe distortion attendant to edge clamping. Further, sideward force components (which in edge clamping are reacted only by surface friction) are here reacted by the T-slots themselves.

DESCRIPTION OF THE PREFERRED EMBODIMENT

Figure 2:
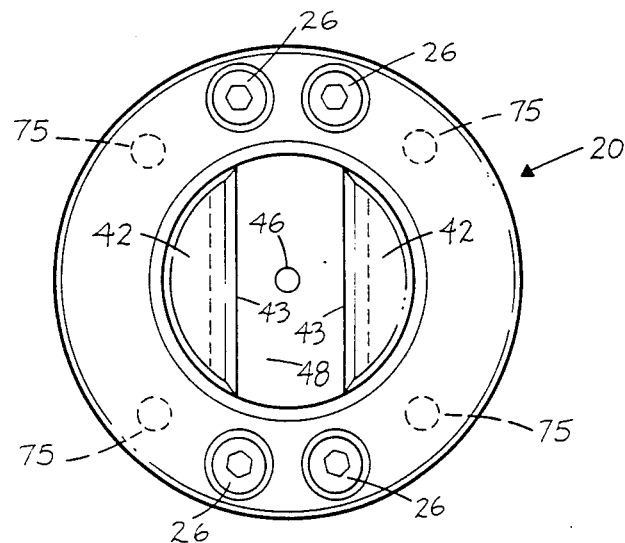
FIG. 2 is a top plan view of FIG. 1.
Figure 1:
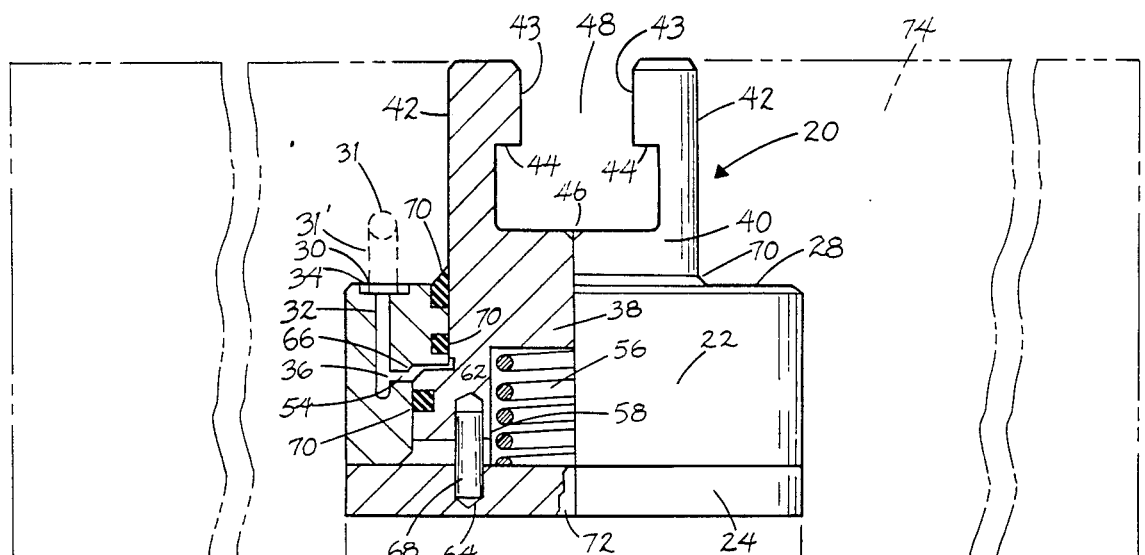
FIG. 1 is a front elevational view of a hydraulic clamp of the present invention with left side broken away. The bed in which the clamp is installed is shown in phantom lines.
Figure 4:
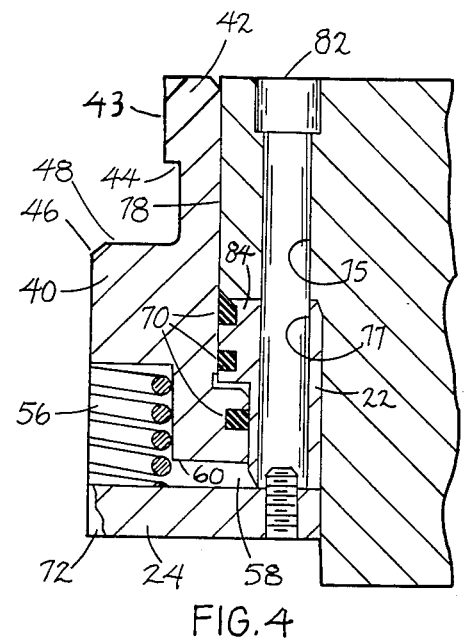
FIG. 4 is a partial cross-section along line 4—4 of FIG. 3.

The hydraulic clamp of the present invention, generally designated 20 and best seen in FIGS. 1 and 2, includes a cylinder 22 and piston 38 assembly, secured onto a cylinder base plate 24 by screws 26, as shown in FIGS. 2 and 4, which extend from and through countersunk drilled holes 25 in the opposite annular cylinder end surface 28. An oil inlet 30, seen in FIGS. 1 and 2, extends inward and downward from the annular end surface 28, providing a vertical oil passage 32 whose upper end, adjacent to the cylinder annular end surface 28, is provided with an oil inlet seal 34. An oil entrant passage 36 extends radially inward from the lower end of the vertical passage 32 to the piston 38, now to be described.

Projecting outward from the cylinder annular end surface 28, is a relatively large diameter piston rod 40 whose integral end is divided by a central slot 48 into two rod side segments 42 having, within the slot 48, parallel slide surfaces 43 and opposite undercut horizontal faces 44 which give the central slot 48 a T-configuration conforming to that of the T-slotted bolster plate in which the clamp 20 is to be installed. A small detent, here a latching depression 46, is formed at the center of the base of the T-configured slot 48.

Except for the upper end portions of the piston rod 40 so described, the mechanism of the clamp 20 is conventional. The piston rod 40 is held in its outwardly projecting position by a compression spring 56 in a central cavity 58 in the piston bottom wall 60. In this bottom wall 60 is an upward-extending alignment bore 62, aligned with a lower bore 64 in the base plate 24; together they accommodate an alignment pin 68 which prevents the piston 38 from rotating within the cylinder 22.

At the juncture of the piston rod 40 with the piston 38 is a beveled annular piston face 50. When no hydraulic pressure is exerted, its inner portion rests against a square-cut cylinder shoulder 52, the bevel providing in effect a ring-like oil distribution groove 54 between the two surfaces. A conventional oil groove 66 is provided in the piston rod 40 at its juncture with the piston face 50. Conventional ring-like oil seals 70 are also provided above and below the beveled piston face 50.

To actuate the clamp 20, oil passes through a tube 27 and oil inlet port 29 and then through the inlet 30 and through horizontal and vertical drilled passages 31,31' to flow against the beveled piston face 50; its pressure provides a downward force, compressing the spring 56 and driving the piston rod 40 inward; an air vent 72 permits this without build-up of air pressure. When the oil pressure is released, the spring 56 returns the piston rod 40 fully outward.

Figure 3:
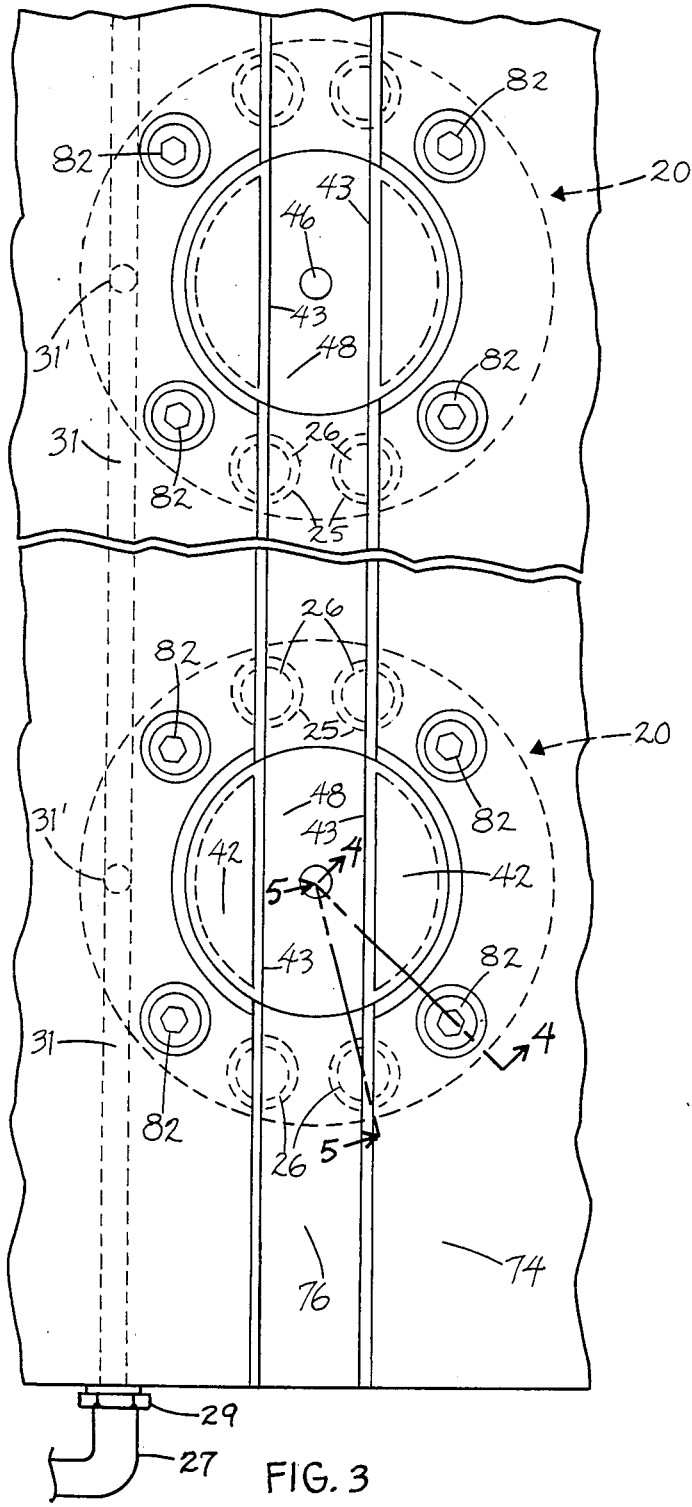
FIG. 3 is a plan view corresponding to FIG. 2 showing the clamp installed in a T-slot.
Figure 5:
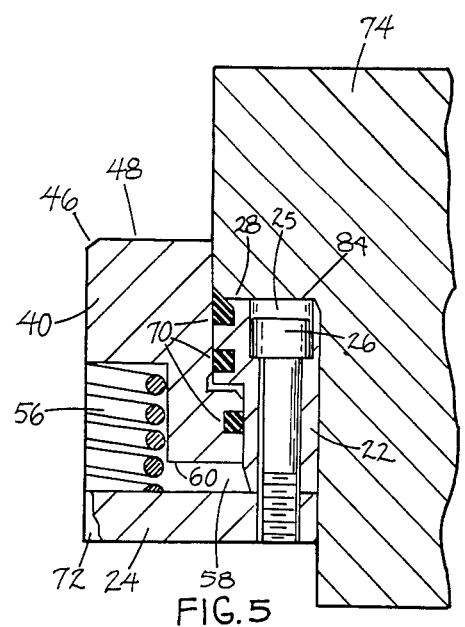
FIG. 5 is a cross-section along line 5—5 of FIG. 3.
Figure 6:
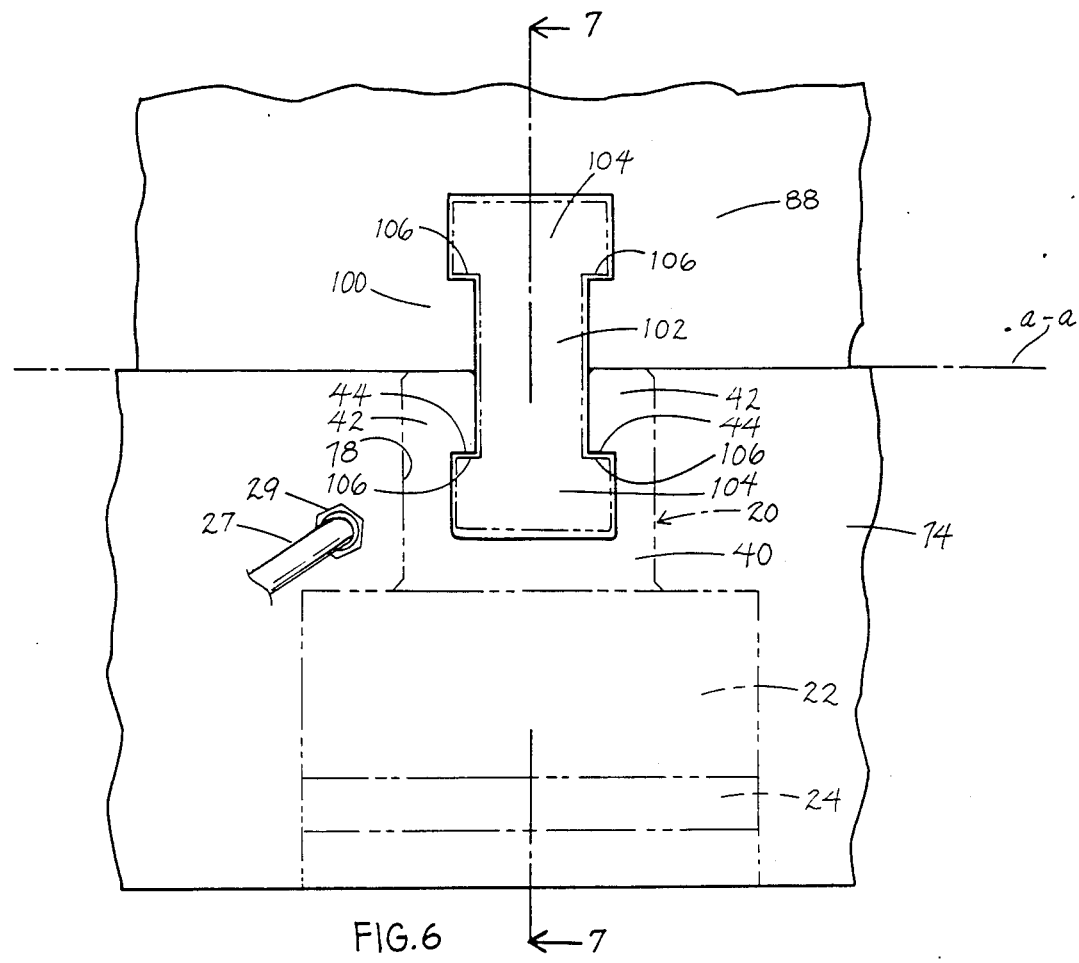
FIG. 6 is a front elevational view of the installation of FIG. 3. A die shoe having a complementary T-slot and a slide-in I-beam clamp connector member are shown in phantom lines.
Figure 7:
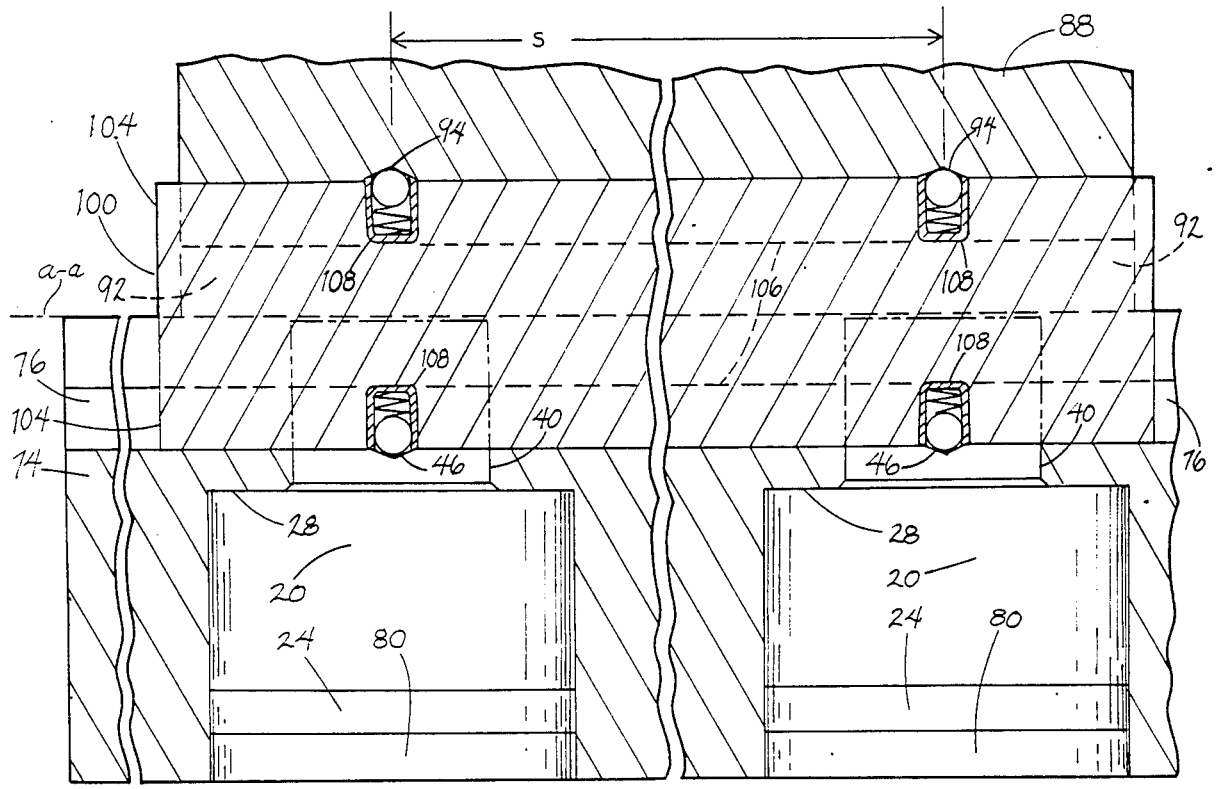
FIG. 7 is a cross-section along line 7—7 of FIG. 6.
Figure 8:
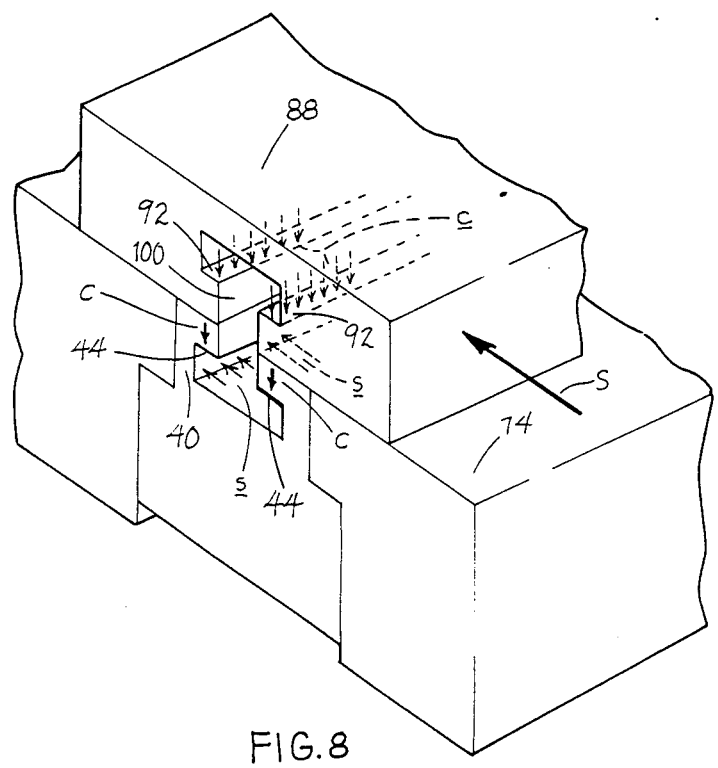
FIG. 8 is a schematic illustration of how concentrated forces on the die shoe of FIG. 4 are applied in distributed manner by its I-beam.

Hydraulic clamps 20 so assembled are mounted by embedding within a T-slotted surface against which a die shoe (or other work member) is to be held, as in the bolster plate 74 of FIGS. 6–8. Such T-slotted bolster plates may be affixed to both the bed and the ram of a punch press or other reciprocating machine tool; or be merely used as portions of work-holding fixtures. The T-slots 76 extend inward from the plate 74 surface and have the same configuration as the T-slots 48 of the piston rods 40. Preferably two clamps are embedded in each selected T-slot at the spacing s shown in FIG. 7. As shown in FIGS. 3 and 5 for each clamp 20 embedded, a bore 78 whose diameter is large enough to slidably receive a piston rod 40, is cut perpendicularly into the bolster plates 74, centered along the centerline of a T-slot 76. A counterbore 80 of a diameter large enough to accommodate its cylinder 22 is cut along the same centerline into that surface of the bolster plate 74 opposite to its T-slotted surface, leaving an annular shoulder 84 at the juncture of the bore 78 and counterbore 80. The shoulder 84 is at such level that when the cylinder end surface 28 is fitted against the shoulder 84 and the piston rod 40 is fully projected outward, its T-slotted end 48 is continuous with the T-slot 76 of the bolster plate 74 and its oil passages 31,31' communicate with oil inlet 30 of the clamp 20. Four bolts 82, shown in FIG. 5, sunk in the surface of the bolster plate 74, extend through drilled holes 75 in the bolster plate 74 and aligned holes 77 in the wall of the cylinder 22, to screw to the base plate 24, attaching the cylinder 22 in place.

A die set consisting of lower and upper dies, each attached to a die shoe, may be clamped as now to be described. Using a typical die shoe 88, in the embodiment shown in FIGS. 6, 7 and 8, its normally flat undersurface 90 is machined with a T-slot 92 of the same configuration as the piston rod T-slot 48. Latching depression detents 94, like the detents in the piston rod T-slot described, are centered along the base of the T-slot 92, at the spacing s shown in FIG. 7.

To secure the die shoe 88 to a bolster plate 74, a securing and force-transmitting member of substantially I-beam shape, here referred to as the I-beam 100, is shown in phantom lines in FIG. 6. It includes a stem portion 102 terminating in opposite cap portions 104; each cap portion 104 has undercut flange surfaces 106, preferably machined to mate with undercut faces such as the faces 44 of the piston rod 40. The shape of the upper and lower halves of the I-beam 100 conforms to the T-slots 48, 92 of the piston rod 40 and the die shoe 88, so that the I-beam 100 may slide within each. Its length is normally greater than the spacing s between the two clamps in a T-slot, and in any event preferably greater than the diameter of the bore 78 in which the piston rod 40 is accommodated. Conventional upper and lower ball detents 108, in registration with each other and illustrated in FIG. 7, are centered along the centerline of the cap portions 104 at the same spacing s as the latching depressions 46, 94.

In securing a die shoe 88 to a bolster plate 74, one cap of an I-beam 100 is slid into the T-slot 92 of the die shoe 88 so that ball detents 108 engage the latching depressions 94 of the die shoe T-slot 92. The opposite half of the I-beam 100 is then slid into the T-slot 76 of the bolster plate 74, passing through and sliding along the parallel slide surfaces 43 of the T-slots 48 of its piston rods 40, with its ball detents 108 engaging the piston latching depressions 46.

Fluid pressure is applied, as heretofore explained, to draw the piston rod 40 inward, causing the flanges 106 of the I-beam cap portions 104 to press against the undercut faces 44 of the T-slots 48. As the broken arrows in schematic FIG. 8 show; two clamping arrows C applied by the piston undercut faces 44 against the flanges 106 of the I-beam 100, is applied, not locally, but as distributed clamping forces c along the undercut faces of the die T-slot 92, over a broad area throughout the interior of the die shoe 88. Such forces, distributed along the interior of a die shoe 88, instead of concentrated pinching forces along a die shoe edge, result in a better distribution of frictional resistance along the bolster plate 74 without die shoe distortion.

When mating die sets are used in high speed punch presses as well as other forming operations, substantial sideward jarring forces may be applied repeatedly to the die shoes. Using prior art edge clamping, no structural member resists such sideward jarring forces; only friction is available.

When the present invention is employed, such sideward forces, shown by the large sideward arrow S against the die shoe 88 of FIG. 8, are transmitted by the I-beam 100 as distributed forces, shown by small sideward arrows s. These distributed faces are exerted against, and reacted by, the inner edge of the bolster plate T-slot 76, over a length extending substantially beyond the T-slotted end of the piston rod 40. Such reaction by the T-slot of sideward forces transmitted through the I-beam 100 itself, substantially lessens the need for clamping friction between the die shoe 88 and the bolster plate 74 surfaces.

By using identically spaced clamps in an upper bolster plate as well, such I-beams with complementary detents will locate and latch upper and lower shoes of die sets in precise alignment with each other automatically, each time they are installed in the machine tool. This invention thus eliminates the lengthy die-alignment steps, greatly reducing the time that a machine is out of service for die changes.

After completing the use of a die set whose shoes are so equipped with T-slots and I-beams, and their removal from the bolster plates of a press, the I-beams are readily removed from the die shoes, which may then be compactly stacked for storage until re-use.

Figure 9:
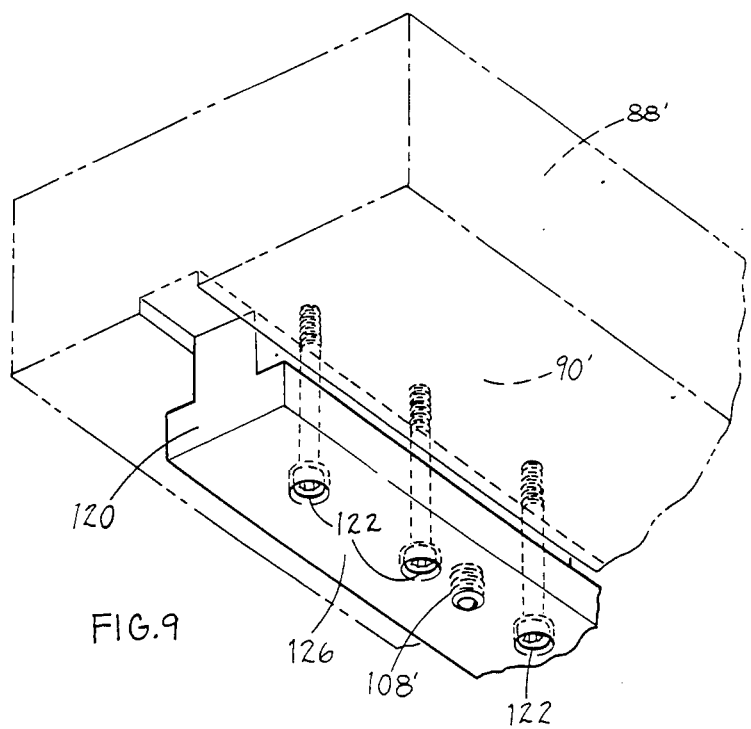
FIG. 9 is a fragmentary view of a T-bar clamp connector member attached by screws to the undersurface of a die shoe shown in phantom lines.

An alternate configuration of a die shoe securing-and-force-transmitting member, useful when a lesser clamping force will suffice, is the T-bar 120 shown schematically in FIG. 9. It includes a stem 124 terminating in a cap portion 126 containing ball detents 108' at the same spacing s. The T-bar 120 is affixed by a plurality of countersunk screws 122 to a grooved undersurface 90' of a die shoe 88' and then slid into a bolster plate T-slot 74, passing through its piston rod T-slots 48, so that its ball detents 108' engage the piston latching depressions 46. The downward pull of the clamps 20 is applied by the undercut faces 44 of the piston rods 40, and is transmitted to its cap portion 126 in the same manner as with the I-beam embodiment. However, the clamping force in this instance is applied to the die shoe 88' only by threads of the screws 122.

While in nearly every case the securing member, whether an I-beam 100 or a T-bar 120, will be longer than the diameter of a piston rod 40, such greater length is not fundamentally required by the present invention. Since the rod side segments 42 are supported by the bolster plate bore 78, so that they cannot bend outward, sideward forces applied by even a short attachment member are rigidly resisted by the bore 78 without relying on friction along the surface of the bolster plate 74. Conventional edge clamping lacks this advantage.

Another advantage is provided by the manner in which the clamps of the present invention are embedded within the T-slotted surfaces of the bolster plates. When the invention is not employed for clamping, the T-slotted surfaces are unencumbered and may be used, and brushed out or otherwise cleaned, as if no clamps were present.

For shops equipped with air pressure lines, these may be used as a source of fluid pressure, and the manner of substitution of pneumatic cylinders will be obvious from this specification.

As other modifications may be made in the constructions herein described and illustrated without departing from the scope of the invention, it is intended that all matter contained in the foregoing description or shown in the accompanying drawings shall be interpreted as illustrative rather than limiting.

We claim:
1. For installation within a bore and counterbore in and through the T-slot of a conventional machine tool bed or bolster plate,
   a fluid-pressure actuated clamp including
   a cylinder whose diameter is adapted to fit within such counterbore, the cylinder having an annular outer end surface adapted to fit at the juncture of such bore and counterbore,
   there being means adjacent to said end surface to provide for inflow of fluid under pressure, and
   a piston rod whose diameter fits slidingly within such bore, and whose length is such as on installation to project into such T-slot and to the level of such bed or bolster plate,
   said piston rod having an integral outward end divided by a central T-slot leaving arcuate faces outwardly of said slot, said slot including parallel slide surfaces terminating in opposite undercut faces, said surfaces and faces being sized for alignment with corresponding surfaces and faces of such T-slot,
   whereby on installation within such T-slotted bed or boltster plate, the said arcuate faces of the piston rod will be supported by such bore to resist forces applied sidewardly.

2. For securing a workpiece to a T-slotted surface of a conventional machine tool bed or bolster plate, combination comprising,
   a fluid-pressure actuated clamp for installation in and through a bore and counterbore of such bed or bolster plate, including
   a cylinder whose diameter is adapted to fit within such counterbore, the cylinder having an annular outer end surface adapted to fit at the juncture of such bore asnd counterbore,
   there being means adjacent to said end surface to provide for inflow of fluid under pressure, and
   a piston rod whose diameter fits slidingly within such bore and whose length is such as on installation to project into such T-slot and to the level of such bed or bolster plate,
   said piston rod having an integral outward end divided by a central T-slot leaving arcuate faces outwardly of said slot, said slot including parallel slide surfaces terminating in opposite undercut faces, said surfaces and faces being sized for alignment with corresponding surfaces and faces of such T-slot, in combination with
   means for securing a workpiece and transmitting side forces thereon to such bed or bolster plate, comprising
   a securing member having a portion of T-configuration so dimensioned as to slide within said piston rod T-slot and whose length is greater than the diameter of said piston rod,
   whereby on installation of said T-configured portion within said T-slot, at least end thereof will extend beyond said piston rod, thereby to deliver side forces, applied against such workpiece, for reaction by such bed or bolster plate.

3. The combination defined in claim 2, there being detent means at the center of the base of said rod T-slot, and complementary detent means along the centerline of the cap of said T-configured portion,
   whereby on sliding, inter-engagement of said detent means with each other serves to located such workpiece.

4. For securing a workpiece having a T-slotted base surface to the T-slotted surface of a conventional machine tool bed or bolster plate, the combination comprising
   a fluid-pressure actuated clamp for installation within a bore and counterbore in and through such bed or bolster plate, including
   a cylinder whose diameter is adapted to fit within such counterbore, the cylinder having an annular outer end surface adapted to fit at the juncture of such bore and counterbore,
   there being means adjacent to said end surface to provide for inflow or fluid under pressure, and
   a piston rod whose diameter fits slidingly within such bore, and whose length is such as on installation to project into such T-slot and to the level of such bed or bolster plate,
   said piston rod having an integral outward end divided by a central T-slot leaving arcuate faces outwardly of said slot,
   said slot including parallel side surfaces terminating in opposite undercut faces, said slot surfaces and faces being sized for alignment with corresponding surfaces and faces of such bed or bolster plate T-slot, in combination with means for securing a workpiece and transmitting side forces thereon to such bed or bolster plate, comprising an I-beam comprised of opposite T-configured portions each so dimensioned as to slide within such T-slots and whose length is greater than the diameter of said piston rod, whereby on engagement of said T-configured portions within such T-slots, the portions of said I-beam extending beyond said piston rod will deliver side forces, applied against such member to be clamped, for reaction by such boltster plate.

5. The combination defined in claim 4, there being detent means at the center of the base of said rod T-slot, and complementary detent means along the centerline of the cap of that I-beam T-configured portion which is slidably engaged therein, there being further detent means along the centerline of the cap of the opposite T-configured portion, wherein sliding inter-engagement of said further detent means with complementary detent means in such T-slot in the base surface of such workpiece will serve to locate such workpiece.

* * * * *

UNITED STATES PATENT AND TRADEMARK OFFICE
CERTIFICATE OF CORRECTION

PATENT NO. : 4,695,047
DATED : September 22, 1987
INVENTOR(S) : Winfried Ehrhardt, et al.

It is certified that error appears in the above-identified patent and that said Letters Patent is hereby corrected as shown below:

In the Abstract, line 8, change "and" to ---an---.

In column 1, line 12, change "ven-tionally" to ---ventionally---.

In column 2, line 27, insert ---partial--- before "cross-section".

In column 6, line 14, change "asnd" to ---and---.

In column 6, line 36, insert ---one--- before "end".

In column 6, line 45, change "located" to ---locate---.

In column 6, line 59, change "or" to ---of---.

In column 6, line 67, change "side" to ---slide---.

In column 8, line 2, change "boltster" to ---bolster---.

In column 8, line 10, change "wherein" to ---whereby---.

Signed and Sealed this

Fifth Day of January, 1988

Attest:

DONALD J. QUIGG

Attesting Officer

Commissioner of Patents and Trademarks